(12) United States Patent  
Routray et al.

(10) Patent No.: US 7,752,287 B2  
(45) Date of Patent: Jul. 6, 2010

(54) METHODS, SYSTEMS, AND COMPUTER PROGRAM PRODUCTS FOR AUTOMATICALLY GENERATING BEST PRACTICES FOR CONFIGURING A NETWORKED SYSTEM

(75) Inventors: Ramani R. Routray, San Jose, CA (US); Prasenjit Sarkar, San Jose, CA (US); Chung-hao Tan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 595 days.

(21) Appl. No.: 11/693,223

(22) Filed: Mar. 29, 2007

(65) Prior Publication Data

US 2008/0244041 A1  Oct. 2, 2008

(51) Int. Cl.  
*G06F 15/177* (2006.01)

(52) U.S. Cl. .................... 709/220; 709/224; 706/12

(58) Field of Classification Search ........... 709/223, 709/224, 220; 700/245; 706/45, 12; 714/48, 714/26  
See application file for complete search history.

(56) References Cited

U.S. PATENT DOCUMENTS

| | | | |
|---|---|---|---|
| 6,006,016 A * | 12/1999 | Faigon et al. ........... | 714/48 |
| 6,633,878 B1 | 10/2003 | Underwood | |
| 7,080,141 B1 * | 7/2006 | Baekelmans et al. ....... | 709/224 |
| 7,260,743 B2 * | 8/2007 | Fellenstein et al. ........ | 714/26 |
| 2004/0030450 A1 * | 2/2004 | Solomon ............. | 700/245 |
| 2004/0059966 A1 * | 3/2004 | Chan et al. ............ | 714/48 |
| 2006/0095705 A1 | 5/2006 | Wichelman et al. | |
| 2006/0112175 A1 * | 5/2006 | Sellers et al. ............ | 709/223 |
| 2008/0126283 A1 * | 5/2008 | Odom et al. ............ | 706/45 |

OTHER PUBLICATIONS

Deepak Ganesan et al., An Evaluation of Multi-resolution Storage for Sensor Networks, SenSys '03, Nov. 5-7, 2003, Los Angeles, CA, USA, Copyright 2003 ACM 1-58113-707-9/03/0011, pp. 89-102.  
Zhifeng Chen et al., Empirical Evaluation of Multi-level Buffer Cache Collaboration for Storage Systems, SIGMETRICS '05, Jun. 6-10, 2005, Banff, Alberta, Canada, Copyright 2005 ACM 1-59593-022-1/05/2006, pp. 145-156.  
Abstract of Journal Article, D.V. Anidi,et al., Storage Area Networking—An Introduction and Future Development Trends, BT Technology Journal, Engineering vol. 20, Nov. 4 / Oct. 2002, 3 pages.

* cited by examiner

*Primary Examiner*—Jungwon Chang  
(74) *Attorney, Agent, or Firm*—Cantor Colburn LLP; Van Nguy

(57) ABSTRACT

A method, system, and computer program product for automatically generating best practices for configuring a networked system of entities are provided. The method includes identifying a networked system configuration problem and determining a set of problematic entities. The set of problematic entities includes the entities reporting the networked system configuration problem. The method further includes determining a set of problem associated entities, where the set of problem associated entities includes the entities with a common association having a strongest correlation to the set of problematic entities. The method additionally includes classifying the set of problem associated entities on an attribute basis to determine one or more attributes of the entities that contribute to the networked system configuration problem, and reporting the best practices for configuring the networked system of entities as avoiding the one or more attributes of the entities that contribute to the networked system configuration problem.

17 Claims, 4 Drawing Sheets

METHODS, SYSTEMS, AND COMPUTER PROGRAM PRODUCTS FOR AUTOMATICALLY GENERATING BEST PRACTICES FOR CONFIGURING A NETWORKED SYSTEM

BACKGROUND OF THE INVENTION

The present disclosure relates generally to configuring a networked system, and, in particular, to methods, systems, and computer program products for automatically generating best practices for configuring a networked system.

A networked system may support attachment of a wide variety of entities, such as host servers, disk array controllers, storage volumes, and client systems. A networked system may include multiple networks, such as one or more storage area networks (SANs) and/or local area networks (LANs). A networked system can be developed via connections to one or more network switches, forming a fabric through which the entities may communicate. As numerous hardware and software vendors have developed custom storage solutions, applications, and operating system interfaces, problems can arise in attempting to integrate multiple entities in a networked system. For example, a networked system may include host servers executing UNIX® and UNIX-like operating systems (e.g., Solaris®, Linux®, AIX®), Microsoft® Windows®, and IBM® z/OS®. When a variety of hardware and software products are integrated in the entities of a networked system, issues due to incompatibilities can arise even though associated product literature may indicate that the products should be capable of working together.

As new products are continually brought to market, the task of analyzing compatibility issues between the products when integrated into entities of a networked system can be daunting. Since the entities in a networked system can have a wide variety of configuration settings, including numerous attributes and associations for each entity, diagnosing the primary contributors to networked system configuration problems can be a challenging and time consuming task. Large teams of technical experts may be assembled to examine configuration issues and analyze data to determine best practices (e.g., solutions that prevent problems from occurring/recurring) for a particular system domain, driving up costs to the system owner. Even when network entities are identified as contributing to a problem, additional complications can arise in determining which attributes and/or associations are the most likely contributors to the problem, especially when the network configuration and/or problem data itself contains errors, such as errant user input or other misreporting of the problem.

What is needed, therefore, is a way to automatically generate best practices for configuring a networked system.

BRIEF SUMMARY OF THE INVENTION

Embodiments of the invention include a method for automatically generating best practices for configuring a networked system of entities. The method includes identifying a networked system configuration problem and determining a set of problematic entities. The set of problematic entities includes the entities reporting the networked system configuration problem. The method further includes determining a set of problem associated entities, where the set of problem associated entities includes the entities with a common association having a strongest correlation to the set of problematic entities. The method additionally includes classifying the set of problem associated entities on an attribute basis to determine one or more attributes of the entities that contribute to the networked system configuration problem, and reporting the best practices for configuring the networked system of entities as avoiding the one or more attributes of the entities that contribute to the networked system configuration problem.

Additional embodiments include a system for automatically generating best practices for configuring a networked system of entities. The system includes a data warehouse holding configuration data for the entities and a networked system configuration problem, and a best practices computer in communication with the data warehouse. The best practices computer performs a method that includes identifying the networked system configuration problem and determining a set of problematic entities. The set of problematic entities includes the entities reporting the networked system configuration problem. The method further includes determining a set of problem associated entities, where the set of problem associated entities includes the entities with a common association having a strongest correlation to the set of problematic entities. The method additionally includes classifying the set of problem associated entities on an attribute basis to determine one or more attributes of the entities that contribute to the networked system configuration problem, and reporting the best practices for configuring the networked system of entities as avoiding the one or more attributes of the entities that contribute to the networked system configuration problem.

Further embodiments include a computer program product for automatically generating best practices for configuring a networked system of entities. The computer program product includes a storage medium readable by a processing circuit and storing instructions for execution by the processing circuit for implementing a method. The method includes identifying a networked system configuration problem, and determining a set of problematic entities, where the set of problematic entities includes the entities reporting the networked system configuration problem. The method further includes determining a set of problem associated entities, where the set of problem associated entities includes the entities with a common association having a strongest correlation to the set of problematic entities. The method additionally includes classifying the set of problem associated entities on an attribute basis to determine one or more attributes of the entities that contribute to the networked system configuration problem, and reporting the best practices for configuring the networked system of entities as avoiding the one or more attributes of the entities that contribute to the networked system configuration problem.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Disclosed herein are methods, systems, and computer program products for automatically generating best practices for configuring a networked system. A networked system may include multiple networks, such as one or more storage area networks (SANs), local area networks (LANs), and/or other varieties of networks. In exemplary embodiments, a SAN includes a collection of entities, such as one or more host servers, switches, and storage subsystems. The SAN may also include entities of greater complexity, such as in-band virtualization boxes. A LAN may include host servers, client systems, and switches/routers/hubs, and the like. Each entity in a networked system may have numerous attributes and associations, defining properties of the entity and the relationship of the entity with other entities in the networked system. Through analysis of configuration data for one or more networks, as well as associated network problem reports, best practices for configuring a networked system may be determined. Generating "best practices" for configuring a networked system refers to a predictive mechanism that determines guidelines based on a minimal combination of entities with specific attributes or associations that should be followed so as to avoid a recurrence of a configuration problem. Best practices can be distinguished from "root cause" analysis, in that root cause analysis attempts to pinpoint an exact cause of a specific problem in a reactive fashion, where best practices can establish rules to avoid configurations that result in a specific problem or class of problems.

Figure 1:
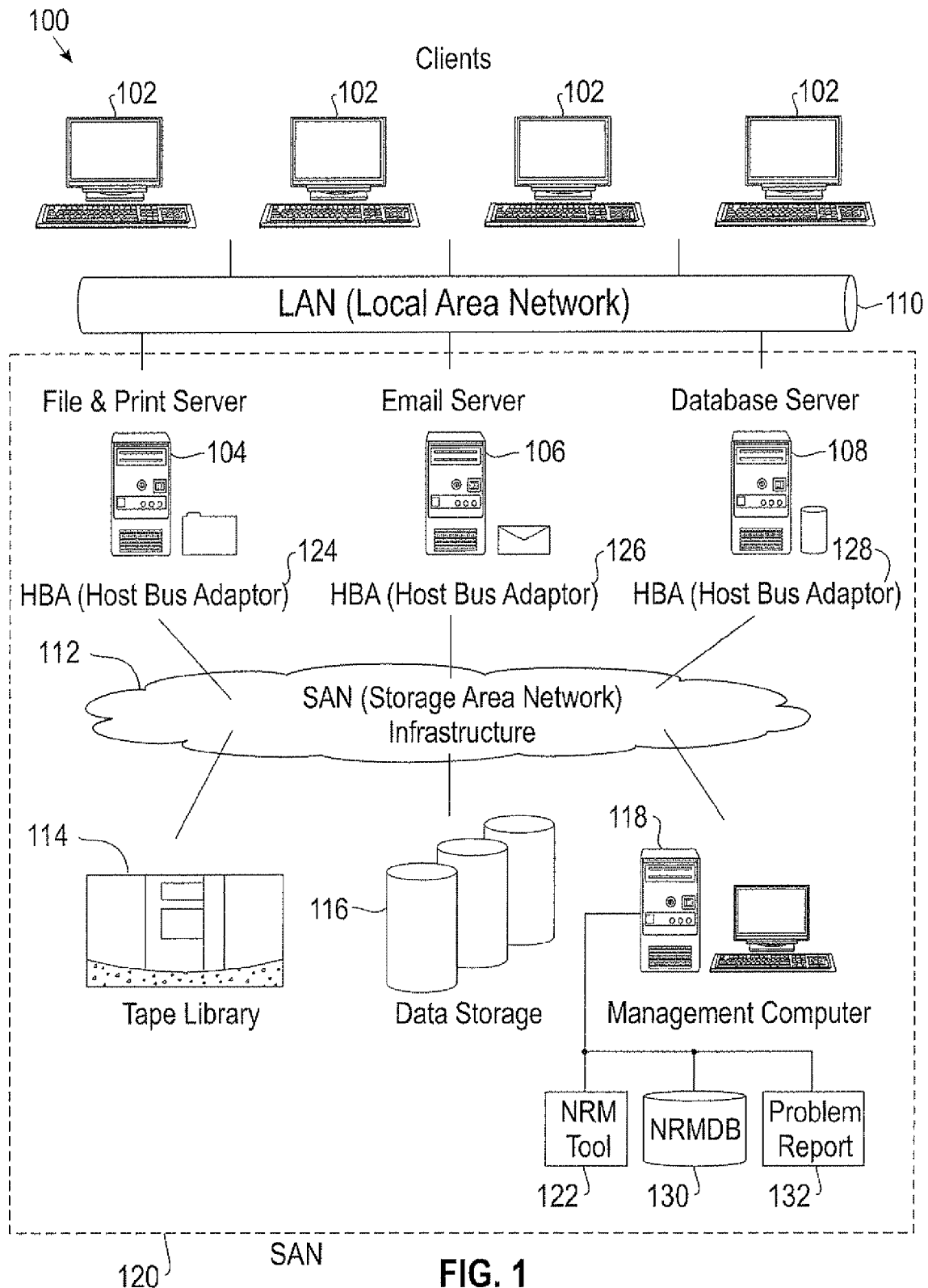
FIG. 1 depicts a networked system upon which networked system configuration best practices analysis may be performed in exemplary embodiments.

Turning now to FIG. 1, an exemplary networked system 100 upon which networked system configuration best practices analysis may be performed will now be described in accordance with exemplary embodiments. In exemplary embodiments, the networked system 100 includes clients 102 and servers 104-108 coupled to a local area network (LAN) 110. The networked system 100 further includes a tape library 114 and data storage 116 coupled to a SAN infrastructure 112. A management computer 118 may also be coupled to the SAN infrastructure 112. In exemplary embodiments, the servers 104-108 are coupled to the SAN infrastructure 112 through host bus adapters (HBAs) 124-128. The SAN infrastructure 112 may include any number of switches, routers, hubs, computers, cables, and the like. In exemplary embodiments, the SAN infrastructure 112 is a Fibre Channel. Through the SAN infrastructure 112 and the HBAs 124-128, the servers 104-108 can read and write data to the tape library 114 and the data storage 116 as requested by the clients 102 via the LAN 110. In exemplary embodiments, each HBA 124-128 has one or more ports that are connected to switch ports on network switches via cables, such as copper wire or fiber optic cables, in the SAN infrastructure 112 to form a SAN fabric. The SAN infrastructure 112 may additionally or alternatively include wireless communication between network entities, such as the HBAs 124-128, the tape library 114, the data storage 116, and the management computer 118. The underlying network topology of the SAN infrastructure 112 may be any topology known in the art and may include connections to other entities not depicted in FIG. 1. The various entities 104-118 and 124-128, including the underlying entities of the SAN infrastructure 112, may be collectively referred to as a SAN 120. While a finite number of entities are depicted in the networked system 100 of FIG. 1, it will be understood that the scope of the invention is not so limited, to the contrary, any size system with any number of servers, HBAs, switches, and storage entities may be supported, such as SANs ranging between 32 to 2500 or more ports. Moreover, the LAN 110 need not be present; however, it will be understood that any size or number of LANs or other network types are considered within the scope of the invention.

The servers 104-108 may be high-speed processing devices (e.g., a mainframe computer) that handle large volumes of processing requests from the clients 102. In exemplary embodiments, the server 104 functions as a file and print server coupled to the SAN infrastructure 112 through one or more ports of the HBA 124. The server 106 may function as an e-mail server coupled to the SAN infrastructure 112 through one or more ports of the HBA 126. In exemplary embodiments, the server 108 functions as a database server coupled to the SAN infrastructure 112 through one or more ports of the HBA 128. The servers 104-108 may further include other functionality not depicted, such as a web server or applications server. The clients 102 may comprise desktop or general-purpose computer devices that generate data and processing requests to the servers 104-108 through the LAN 110. The networks 110 and 120 may be part of an intranet, extranet, or an internetwork, such as the Internet, or a combination thereof. The LAN 110, similar to the SAN infrastructure 112, may include a wireless and/or wireline network infrastructure. The data storage 116 and the tape library 114 may include any number of subsystems, referred to generally as "storage subsystems". The management computer 118 may be any type of computer known in the art, such as a server, a workstation, a personal computer, or the like, and may interface to the SAN infrastructure 112 via an MBA (not depicted). In exemplary embodiments, the management computer 118 executes management software, such as a network resource management (NM) tool 122, that supports administrative functions including configuring the entities of the system 100. The NRM tool may support configuring entities coupled through and within the SAN infrastructure 112 and/or the LAN 110. The NRM tool 122 executing upon the management computer 118 may also support tracking problems and storing problems and configuration data to one or more databases, such as network resource management database (NRMDB) 130 and problem report 132. The NW tool 122, the NRMDB 130, and the problem report 132 may support configuration data and problem tracking for all of the entities of the networked system 100, and are not limited to the SAN 120. In alternate exemplary embodiments, the management computer 118 is coupled to the LAN 110. While the networked system 100 represents an exemplary networked system, more advanced networks may be supported, such as a network with virtualization at different levels. For example, access to the networked system 100 may be supported through a "virtual machine" instead of the servers 104-108.

Each entity within a networked system, such as the networked system 100, may have a direct attribute, an association, and/or a derived attribute. A direct attribute is an inherent property of the entity. In the case of the servers 104-108, the direct attributes of each server may include: one or more IP addresses, a host name, an operating system, and a memory size among others. In exemplary embodiments, each entity has one or more associations, where an association links one or more types of entities, such as a fabric, a zone, a zone-set, an access control list, or network links. A fabric is a logical network entity that may consist of a set of switches within the SAN infrastructure 112, which act in unison along with the servers 104-108 connected via the HBAs 124-128, together with the storage subsystems, including the data storage 116 and the tape library 114. The management computer 118 may also be part of one or more fabrics. In exemplary embodiments, a zone is a collection of ports in a fabric that are visible to each other, and a zone-set is a collection of zones in the fabric. An access control list may include a set of host ports, storage subsystem ports and storage volumes that indicates a path via which the host may access a volume, such as ports of HBA 124 through which the server 104 may access data via ports and volumes on the data storage 116. In exemplary embodiments, network links are connections between two ports.

In exemplary embodiments, a derived attribute is a property that is logically derived from the direct attributes and associations present in the networked system 100. Derivations may be made to compose best practices for a networked system configuration problem. When best practices for a networked system configuration problem are automatically generated, the identity of the derived attributes may not be known in advance. Derived attributes may represent summarized information for an association type based on the direct attributes of entities related through the association type. In exemplary embodiments, the derived attributes include properties such as a zone count and heterogeneous operating systems. The zone count derived attribute may indicate the number of ports in a zone. The heterogeneous operating systems derived attribute may indicate whether the servers, such as the servers 104-108, belong to a zone having heterogeneous operating systems (e.g., all executing Linux®). Many other derived attributes may be defined or developed as described in greater detail herein.

Figure 2:
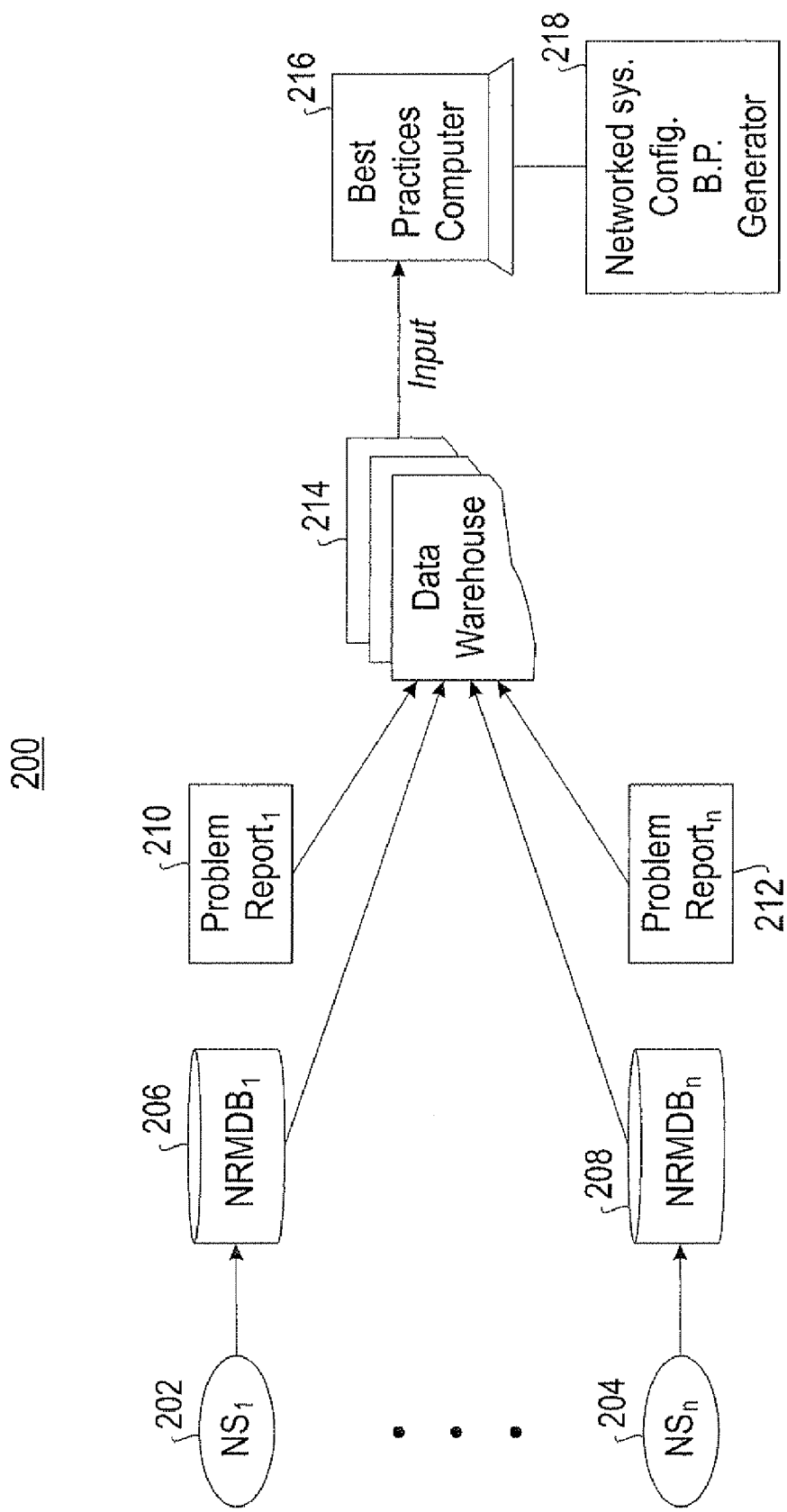
FIG. 2 depicts a system upon which a networked system configuration best practices generator may be implemented in exemplary embodiments.

Turning now to FIG. 2, an exemplary system 200 upon which a networked system configuration best practices generator may be implemented will now be described in accordance with exemplary embodiments. In exemplary embodiments, the system 200 includes networked systems $NSs_{1 \ldots n}$ 202-204, $NRMDBs_{1 \ldots n}$ 206-208, problem reports$_{1 \ldots n}$ 210-212, a data warehouse 214 in communication with a best practices computer 216, and a networked system configuration best practices generator (NSCBPG) 216, where "n" represents the number of networked system available to analyze. Each $NS_{1 \ldots n}$ 202-204 may represent a different deployment of a networked system, such as the networked system 100 of FIG. 1. An administrator may monitor for problems and record problems using an NRM tool executing upon a management computer, such as the NRM tool 122 of FIG. 1. Examples of such NRM tools include EMC ControlCenter®, HP® AppIQ®, IBM® TPC™, and Veritas® CommandCentral®. A snapshot of the configuration of the networked system, such as the networked system 100 of FIG. 1, may be stored in a database to assist with problem determination, such as the NRMDB 130 of FIG. 1. The administrator may also generate a problem report that is associated with the configuration snapshot in the database, such as the problem report 132 of FIG. 1. For example, the networked system 100 of FIG. 1 may be represented as the $NS_1$ 202 of FIG. 2, with the administrator storing the networked system configuration snapshot to the $NRMDB_1$ 206 of FIG. 2 (e.g., the NRMDB 130 of FIG. 1) and the problem report to the problem report$_1$ 210 of FIG. 2 (e.g., the problem report 132 of FIG. 1). In exemplary embodiments, the system 200 of FIG. 2 collects information from multiple NSs, associated NRMDBs, and problem reports (e.g., $NSs_{1 \ldots n}$ 202-204, $NRMDBs_{1 \ldots n}$ 206-208, and problem reports$_{1 \ldots n}$ 210-212), storing the data in the data warehouse 214. The data may be sent to or acquired by the data warehouse 214 using any communication technique known in the art, such as a network file or data transfer through an intranet or Internet communication link. The data warehouse 214 may be implemented as a database or in any type of storage element known in the art. The data warehouse 214 may reside in a secondary storage element or in internal memory within the best practices computer 216. In alternate exemplary embodiments, the data warehouse 214 is a virtual data warehouse enabling mapping between the best practices computer 216, the $NRMDBs_{1 \ldots n}$ 206-208, and the problem reports$_{1 \ldots n}$ 210-212.

In exemplary embodiments, when there is a sufficient number of problem reports$_{1 \ldots n}$ 210-212 and configuration snapshots in the $NRMDBs_{1 \ldots n}$ 206-208 gathered in the data warehouse 214, the best practices computer 216 executes the NSCBPG 218 to determine the best practices that are likely to prevent the reported problems. By examining numerous networked system configurations, an increased volume of data is available as compared to a single configuration, thus improving the accuracy of best practice generation results. In exemplary embodiments, unique names are used to identify the networked system entities and attributes in the $NSs_{1 \ldots n}$ 202-204. The best practices computer 216 may be any type of computer or computing technology known in the art, such as the management computer 118 of FIG. 1, and may include a processing circuit capable of reading a storage medium that stores instructions for execution by the processing circuit. In exemplary embodiments, the best practices computer 216 executes the NSCBPG 218. Alternatively, the NSCBPG 218 may be a distributed application with a user interface available through a client, such as the client 102 of FIG. 1. When the NSCBPG 218 analyzes the problem data within the data warehouse 214, the NSCBPG 218 may output a list of best practices as depicted in table 1 to avoid future networked system configuration problems.

TABLE 1

Exemplary Best Practices for a Networked System
Exemplary Best Practices

1. A zone should only contain servers with a single operating system.
2. Same HBA should not be used to access both disk and tape storage.
3. There should be no more than n zones in a fabric.
4. There should be a maximum of m zone members in a zone.
5. There should not be more than k paths from a host to a storage controller.
6. All HBAs from vendor X should be of type A, B or C.
7. All the HBAs in a zone should be from the same vendor.
8. Windows and Linux servers should not be in the same zone.
9. There should be at least l paths from a host to its storage.
10. There should be no duplicate World Wide Names in a networked system.

Various networked system configuration problems that may exist in a networked system, such as the networked system 100 of FIG. 1, may be classified into categories to generalize the types of problems identified and the appropriate best practice. In exemplary embodiments, five categories can be established to determine a best practice and problem type, including Cartesian, connectivity, exclusion, many-toone, and one-to-many. For example, assume a set of entities E with elements $e_1 \ldots e_n$, each with attributes $a_1 \ldots a_r$. Further assume that there are associations A with instances $A_1 \ldots A_k$ where each association $A_l$ groups a subset of entities in E. The categories that represent the best practices are further described herein with examples referring to one or more best practices in table 1. An exemplary Cartesian best practice for a problem may be determined as: given set of values $v_1 \ldots v_m$ for attributes $a_1 \ldots a_m$, avoid configurations where an element $e_i$ belonging to E satisfies the relationship $e_i.a_1=v_1 \& \ldots \& e_i.a_m=v_m$. Exemplary Cartesian best practices are illustrated in items 3, 4 and 6 of table 1. An exemplary connectivity best practice for a problem may be determined as: given an association $A_l$, avoid configurations where the number of instances of the association $A_l$ between two entities $e_a$ and $e_b$ does not exceed a certain threshold k. Exemplary connectivity best practices are illustrated in items 5 and 9 of table 1. An exemplary exclusion best practice for a problem may be determined as: given a set of values $v_{11} \ldots v_{1m}$ and $v_{21} \ldots v_{2m}$ for attributes $a_1 \ldots a_m$, avoid configurations of elements $e_i$ and $e_j$ belonging to E that satisfy $e_i.a_1=v_{11} \& \ldots \& e_i.a_m=v_{1m} \& e_j.a_1 \ne v_{21} \& \ldots \& e_j.a_m \ne v_{2m}$. Exemplary exclusion best practices are illustrated in items 2 and 8 of table 1. An exemplary many-to-one best practice for a problem may be determined as: avoid configurations where the value of a set of attributes $a_1 \ldots a_m$ is not the same for all entities $e_i$ in an instance of an association $A_k$. Exemplary many-to-one best practices are illustrated in items 1 and 7 of table 1. An exemplary one-to-one best practice for a problem may be determined as: avoid configurations where the value of a set of attributes $a_1 \ldots a_m$ is not different and unique for all entities $e_i$ in an instance of an association $A_k$. An exemplary one-to-one best practice is illustrated in item 10 of table 1. As can be seen from the examples, the development of a best practice may rely upon one or more association or attribute (direct or derived) that is responsible for the networked system configuration problem; however, a best practice need not incorporate both an association and an attribute.

Figure 3:
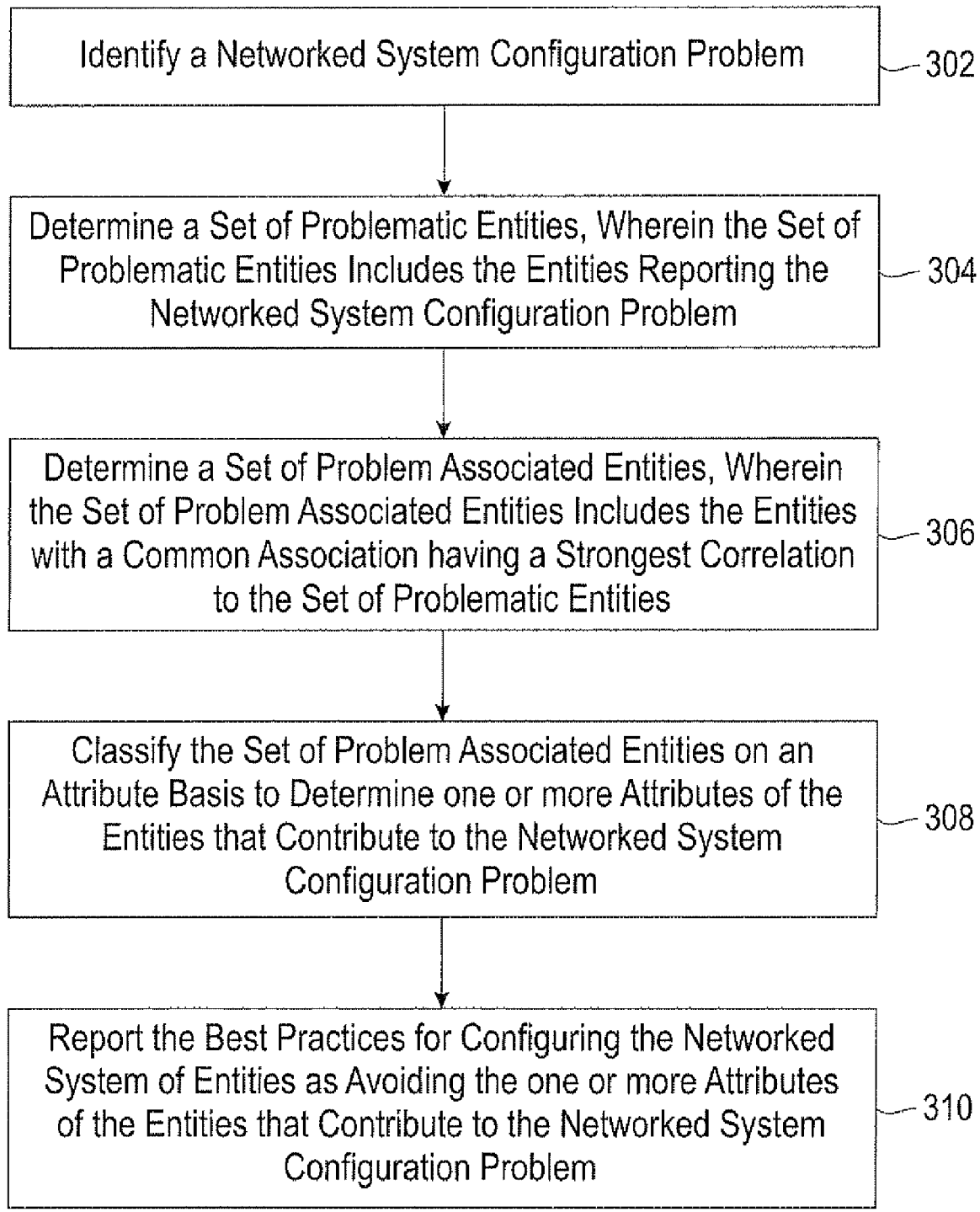
FIG. 3 is a flow diagram describing a process for automatically generating best practices for configuring a networked system in exemplary embodiments.

Turning now to FIG. 3, a process 300 for automatically generating best practices for configuring a networked system will now be described in reference to the system 200 of FIG. 2 and in accordance with exemplary embodiments. At step 302, the NSCBPG 218 identifies a networked system configuration problem through accessing problem reports, such as the problem reports$_{1 \ldots n}$ 210-212, stored in the data warehouse 214. In exemplary embodiments, the NSCBPG 218 identifies networked system configuration data from the NRMDBs$_{1 \ldots n}$ 206-208 associated with the networked system configuration problem via in the data warehouse 214. The networked system configuration data may include entity, association, and attribute information from multiple networked systems, such as the NSs$_{1 \ldots n}$ 202-204. Although it may be preferable to have as complete of networked system configuration and problem report information as possible, the NSCBPG 218 may determine best practices with incomplete information, such as information only related to a SAN within a networked system (e.g., SAN 120 of the networked system 100). Moreover, when large volumes of data are available in the data warehouse 214, the NSCBPG 218 may tolerate some degree of "noise" in the data, e.g., errant data or incomplete records.

At step 304, the NSCBPG 218 determines a set of problematic entities that includes the entities reporting the networked system configuration problem. The NSCBPG 218 may determine the set of problematic entities through accessing data stored in the data warehouse 214. The set of problematic entities may include various entity types, such as servers, HBAs, and other entity as depicted in the networked system 100 of FIG. 1, as well as other entity types previously described. The set of problematic entities may further include entities in multiple networked systems, such as the NSs$_{1 \ldots n}$ 202-204, that have the same networked system configuration problem.

At step 306, the NSCBPG 218 determines a set of problem associated entities, which may include the entities with a common association having a strongest correlation to the set of problematic entities. The NSCBPG 218 may determine a set of problem associated entities by identifying one or more associations for each entity, and generating a list of association instances from the identified one or more associations (e.g., association="Zone", association instances="Zone1" and "Zone2"). The NSCBPG 218 may create lists of entities, where each list of entities is created on a per association instance basis. In exemplary embodiments, the NSCBPG 218 applies a metric to each list of entities with respect to the set of problematic entities, and selects the association instance for the list of entities with a top ranking metric as the common association having the strongest correlation to the set of problematic entities. The metric may include any metric known in the art that establishes the relative strength of association between two sets, such that the strongest correlation can be determined by ranking the results after applying the metric. In exemplary embodiments, the metric includes a precision metric, a recall metric, or a combination thereof. The precision metric may represent a ratio of an intersection of two sets relative to the first set, while the recall metric may represent a ratio of the intersection of the two sets relative to the second set. For example, suppose there are two sets Y and Z, where: Y={1, 2, 3} and Z={3, 4}, with an intersection of X {3}. If |X| is the number of elements in X, then the precision metric |X|/|Y|=⅓=0.33, and the recall metric=|X|/|Z|=½=0.5. A combined precision-recall metric can be calculated that includes both the precision and recall metrics as: precision*recall=0.33*0.5=0.167. The strongest correlation may be determined through ranking the results after the metric is applied.

The NSCBPG 218 may merge the lists of entities with independent association instances. In exemplary embodiments, independence is established when the association instances do not have behavioral implications on each other in terms of the network operations. For example, multiple port-to-port connections between a pair of entities may be considered independent. The NSCBPG 218 may apply the metric to each of the merged lists of entities, and include the metric for each merged list of entities in selecting the association instance with the top ranking metric. Thus the set of problem associated entities can be determined from the entities with a common association having a strongest correlation to the set of problematic entities, where the common association can be an individual association instance or a merged association instance. Moreover, the common association may be a null value. In exemplary embodiments, the null value association implies the absence of an association in the best practice, (e.g., the best practice may only involve a direct or derived attribute).

Figure 4:
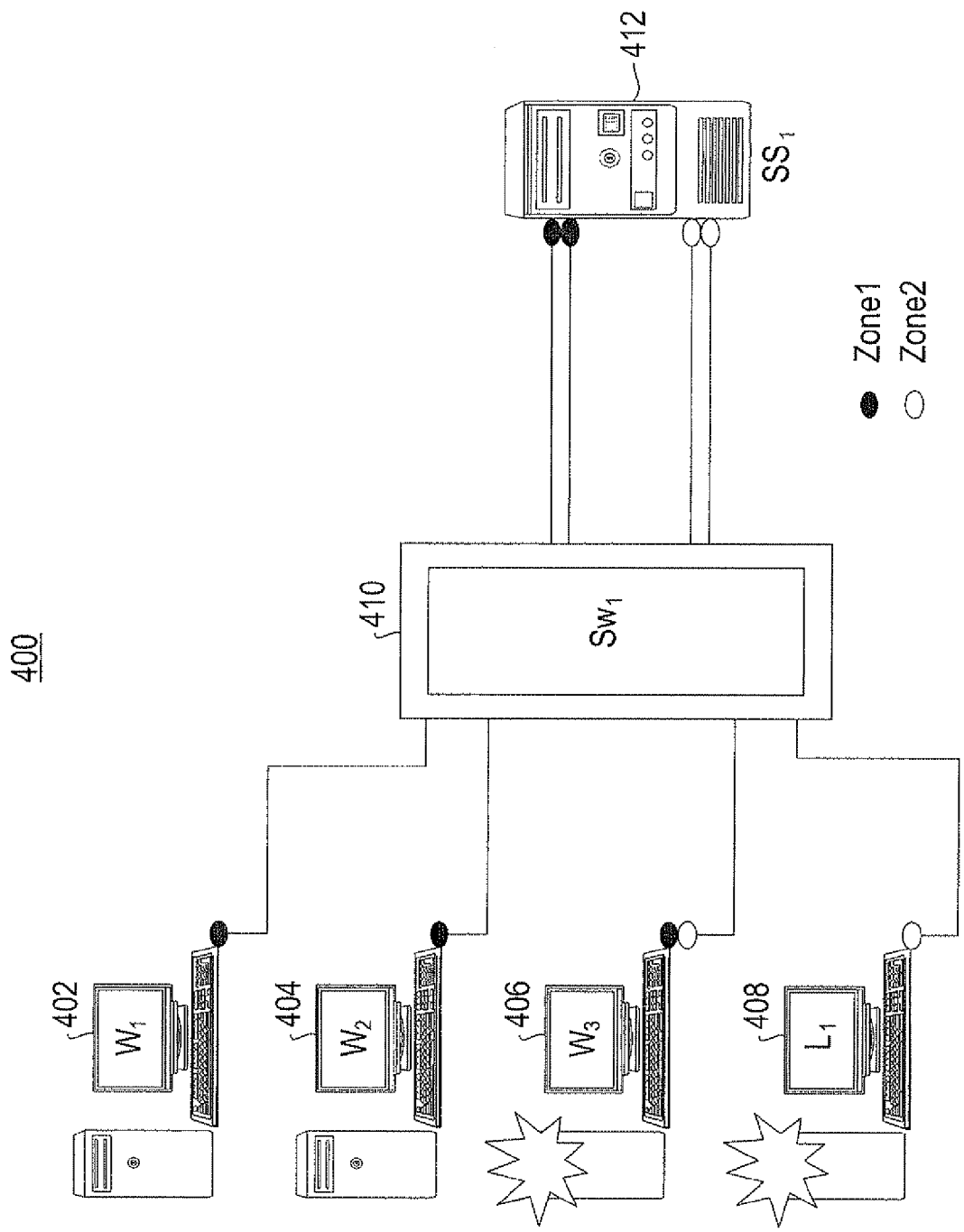
FIG. 4 depicts a networked system upon which networked system configuration best practices analysis may be performed in exemplary embodiments.

Turning now to FIG. 4, a networked system 400 is depicted upon which networked system configuration best practices analysis may be performed in exemplary embodiments. In exemplary embodiments, the networked system 400 includes three hosts $W_1$ 402, $W_2$ 404, $W_3$ 406 executing Windows® operating systems and a host $L_1$ 408 executing a Linux® operating system. All the four hosts 402-408 are connected via a switch $SW_1$ 410 to a storage subsystem $SS_1$ 412 in a fabric Fabric1. The Windows® hosts $W_1$ 402, $W_2$ 404, $W_3$ 406 and the storage subsystem $SS_1$ 412 are in a zone Zone1, while the hosts $W_3$ 406 and $L_1$ 408 and the storage subsystem $SS_1$ 412 are in a zone Zone2. For purposes of example, assume that subsystem access problems are reported in the hosts $W_3$ 406 and $L_1$ 408 as the set of problematic entities.

To determine the set of problem associated entities, including the entities with a common association having a strongest correlation to the set of problematic entities, step 306 of FIG. 3 may be applied to the exemplary networked system 400 of FIG. 4 as performed by the NSCBPG 218 of FIG. 2. The NSCBPG 218 may calculate the set of problematic entities=($W_3$ 406, $L_1$ 408). The NSCBPG 218 may identify one or more associations=(Zone, Fabric). The NSCBPG 218 may generate a list of list of association instances=(Zone1, Zone2, Fabric1). The NSCBPG 218 can then create lists of entities for each association instance, such that E(Zone1)=($W_1$ 402, $W_2$ 404, $W_3$ 406, $SS_1$ 412), E(Zone2)=($W_3$ 406, $L_1$ 408, $SS_1$ 412) and E(Fabric1)=($W_1$ 402, $W_2$ 404, $W_3$ 406, $L_1$ 408, $SW_1$ 410, $SS_1$ 412). No mergers are possible in this example as the association instances are not independent. In exemplary embodiments, the metric is calculated as a combined precision and recall metric, with the resulting combined variable metric as shown in table 2. In this example, Zone2 is selected as the association instance with the top ranking metric, and thus Zone2 and the entities therein would be defined as the common association having the strongest correlation to the set of problematic entities.

TABLE 2

Precision-Recall for association instances

| Association Instance | Precision-Recall |
|---|---|
| Zone1 | 0.125 |
| Zone2 | 0.66 |
| Fabric1 | 0.33 |

Returning to the process 300 of FIG. 3, at step 308, the NSCBPG 218 classifies the set of problem associated entities on an attribute basis to determine one or more attributes of the entities that contribute to the networked system configuration problem. A classification approach can be used to determine the purest subset of attributes that are indicative of the networked system configuration problem. To aid in the classification process, a decision tree may be utilized primarily because the results are easily interpretable by the NSCBPG 218. A decision tree describes a tree structure wherein leaves represent classifications and branches represent conjunctions of features that lead to those classifications. In exemplary embodiments, the NSCBPG 218 creates the decision tree by splitting source data into subsets based on an attribute value test. The splitting of subsets into one or more further subsets may be repeated on each subset in a recursive manner. In exemplary embodiments, the recursion is completed when splitting is either non-feasible, or a singular classification can be applied to each element of at least one subset. The source data may be selected from the entity types for the set of problem associated entities. Multiple decision trees may be created, such as individual decision trees for each entity type (e.g., HBAs, storage subsystems, and the like). Splitting may be considered non-feasible when subsets meet or exceed a minimum threshold size, or increased classification purity cannot be achieved. Classification purity may be determined by comparing a particular attribute or attribute value to members of each subset as the decision tree is created or analyzed. The splitting need not reach an absolutely singular level of classification to terminate, as there may be errant data in the configuration or problem report information.

Since there may be multiple types of entities (e.g., switches, hosts and subsystems) with disjoint attribute sets, while a decision tree may use a single entity type as input, thus a join operation may be performed. In exemplary embodiments, the NSCBPG 218 performs a join operation (e.g., a database join) to combine entity types for the set of problem associated entities to form an aggregated entity type, and the NSCBPG 218 uses the aggregated entity type as the source data for the decision tree.

While a decision tree may be applied to direct attributes, a decision tree may also be applied to derived attributes for classification to determine one or more attributes to avoid as a best practice. In exemplary embodiments, derived attributes can be identified via analyzing the associations in a network, such as the networked system 400 of FIG. 4. In the networked system 400 configuration, there are a number of associations as previously described. For example, the Fabric association consists of computers (hosts), a switch, and a storage subsystem.

In exemplary embodiments, each association is represented as a derived entity in an entity-relationship model corresponding to the networked system domain. In establishing derived entities through an entity-relationship model, the NSCBPG 218 may read or create a table corresponding to each association in the networked system 400. Once derived entities are determined, association types may be input into the decision-tree classifier for derived attribute identification.

Derived attribute generation may be performed when association instances are identified within the networked system 400 through calculating summary information for attributes of the entities involved in the association instances. For example, if a Computer (host/server) and a Zone entity types are selected, the summary information for the Computer entity type is computed and added to the Zone entity type as one or more attributes. The summary information is thus referred to as the derived attributes for the association type.

For each entity type that is linked with an association type, the NSCBPG 218 may compute the summary information on each of the attributes in the entity type. In exemplary embodiments, the NSCBPG 218 can compute numerous aggregate functions for the summary information, such as: an average, a minimum, a maximum, a count, a distinct count, and a sum. While many other summary information data can be calculated, the count and the distinct count aggregate functions may be preferred in determining best practices. In exemplary embodiments, for each attribute, distinct values are determined. For each distinct value, the NSCBPG 218 may determine a count attribute and a Boolean existence attribute. The count attribute may include a count of data instances with distinct values. In exemplary embodiments, the Boolean existence attribute indicates the existence of a distinct value within a particular association on a true/false basis. When data is sparse, the Boolean existence attribute may help the classification technique (e.g., the decision tree) to correctly obtain the best practices.

For example, assume that instances in the Computer entity type as shown in table 3 have been identified relative to the networked system 400 of FIG. 4. The attributes COMP_ID and HOSTNAME may be eliminated from consideration as derived attributes, since the COMP_ID attribute is a primary key for the table, and the HOSTNAME attribute has a uniqueness constraint (e.g., two different hosts cannot have the same name), hence is not considered for attribute derivation. For the OSTYPE attribute, distinct values may be obtained, which are "Windows" and "Linux". In exemplary embodiments, for the association type Zone entity, the NSCBPG 218 adds two attributes for each distinct value, given that the entity types Zone and Computer are considered for the source data input to the decision-tree classifier. Table 4 depicts instances of the Zone entity type with the derived attributes added. Note that for classification, the NSCBPG 218 may utilize both the direct attributes and the derived attributes. Thus the NSCBPG 218 may determine that Zone2 is the common association, as previously described, and further determine that the derived attribute information for Zone2 as depicted in table 4 may be used to define a best practice, such as "Windows and Linux servers should not be in the same zone", as previously illustrated in item 8 of table 1.

TABLE 3

Computer entity type instances

| COMP_ID | HOSTNAME | OSTYPE | ZONE_ID |
|---|---|---|---|
| 1 | W1 | Windows | 1 |
| 2 | W2 | Windows | 1 |
| 3 | W3 | Windows | 1 |
| 3 | W3 | Windows | 2 |
| 4 | L1 | Linux | 2 |

TABLE 4

Zone entity type instances with derived attributes

| ZONE_ID | N_Windows | HAS_Windows | N_Linux | HAS_Linux |
|---|---|---|---|---|
| 1 | 3 | True | 0 | False |
| 2 | 1 | True | 1 | True |

Returning again to the process 300 of FIG. 3, at step 310, the NSCBPG 218 reports the best practices for configuring the networked system of entities as avoiding the one or more attributes of the entities that contribute to the networked system configuration problem. The one or more attributes may include any combination of direct or derived attributes. The NSCBPG 218 may also report the best practices for configuring the networked system of entities as avoiding the common association. The reporting format may be a file, such as a text file, a Web browser readable file, a binary file, an e-mail message, a printed page format, or any other output format known in the art. The reported best practices may be provided to a user of the best practices computer 216 of FIG. 2, or any networked system entity, such as the management computer 118 or the client 102 of FIG. 1.

Technical effects of exemplary embodiments include automatically generating best practices for configuring a networked system. Further technical effects may include an ability to accurately determine a best practice for a networked system configuration problem in data sets that include errant configuration and/or problem information. Advantages may include reducing the labor required to analyze large volumes of data associated with networked system configuration problems through an automated (e.g., computer implemented) solution.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for automatically generating best practices for configuring a networked system of entities, the method comprising:
   identifying a networked system configuration problem;
   determining a set of problematic entities, wherein the set of problematic entities includes the entities reporting the networked system configuration problem;
   determining a set of problem associated entities, wherein the set of problem associated entities includes the entities with a common association having a strongest correlation to the set of problematic entities, by a best practices computer performing:
      identifying one or more associations for each entity, the one or more associations defining links between the entities;
      generating a list of association instances from the identified one or more associations;
      creating lists of entities, wherein each list of entities is created on a per association instance basis;
      applying a metric to each list of entities with respect to the set of problematic entities, wherein the metric includes at least one of a precision metric and a recall metric representing a ratio of an intersection of each list of entities with respect to the set of problematic entities; and
      selecting the association instance for the list of entities with a top ranking metric as the common association having the strongest correlation to the set of problematic entities;
   classifying the set of problem associated entities on an attribute basis to determine one or more attributes of the entities that contribute to the networked system configuration problem; and reporting the best practices for configuring the networked system of entities as avoiding the one or more attributes of the entities that contribute to the networked system configuration problem.

2. The method of claim 1 wherein reporting the best practices for configuring the networked system of entities further comprises reporting the common association.

3. The method of claim 1 wherein the entities include entities from more than one networked system.

4. The method of claim 1 further comprising:
merging the lists of entities with independent association instances;
applying the metric to each of the merged lists of entities; and
including the metric for each merged list of entities in selecting the association instance with the top ranking metric.

5. The method of claim 1 wherein the networked system includes a storage area network.

6. The method of claim 1 wherein classifying the set of problem associated entities on an attribute basis is performed using a decision tree.

7. The method of claim 6 further comprising:
creating the decision tree by recursively splitting source data into subsets based on an attribute value test until either further splitting is non-feasible or a singular classification can be applied to each element of at least one subset.

8. The method of claim 7 further comprising:
performing a join operation to combine entity types for the set of problem associated entities to form an aggregated entity type; and
using the aggregated entity type as the source data.

9. The method of claim 1 wherein the one or more attributes include a direct attribute.

10. The method of claim 1 wherein the one or more attributes include a derived attribute.

11. The method of claim 1 further comprising:
determining one or more derived attributes for the entities in the networked system, the determining including:
applying a decision tree classifier for association types; and
calculating summary attribute information for the association types.

12. The method of claim 1 wherein the common association is a null value.

13. A system for automatically generating best practices for configuring a networked system of entities, the system comprising:
a data warehouse holding configuration data for the entities and a networked system configuration problem; and
a best practices computer in communication with the data warehouse, the best practices computer configured to perform a method comprising:
identifying the networked system configuration problem;
determining a set of problematic entities, wherein the set of problematic entities includes the entities reporting the networked system configuration problem;
determining a set of problem associated entities, wherein the set of problem associated entities includes the entities with a common association having a strongest correlation to the set of problematic entities, the determining comprising:
identifying one or more associations for each entity, the one or more associations defining links between the entities;
generating a list of association instances from the identified one or more associations;
creating lists of entities, wherein each list of entities is created on a per association instance basis;
applying a metric to each list of entities with respect to the set of problematic entities, wherein the metric includes at least one of a precision metric and a recall metric representing a ratio of an intersection of each list of entities with respect to the set of problematic entities; and
selecting the association instance for the list of entities with a top ranking metric as the common association having the strongest correlation to the set of problematic entities;
classifying the set of problem associated entities on an attribute basis to determine one or more attributes of the entities that contribute to the networked system configuration problem; and
reporting the best practices for configuring the networked system of entities as avoiding the one or more attributes of the entities that contribute to the networked system configuration problem.

14. The system of claim 13 wherein the method further comprises:
merging the lists of entities with independent association instances;
applying the metric to each of the merged lists of entities; and
including the metric for each merged list of entities in selecting the association instance with the top ranking metric.

15. The system of claim 13 wherein classifying the set of problem associated entities on an attribute basis is performed using a decision tree.

16. A computer program product for automatically generating best practices for configuring a networked system of entities, the computer program product comprising:
a storage medium readable by a processing circuit and storing instructions for execution by the processing circuit for implementing a method comprising:
identifying a networked system configuration problem;
determining a set of problematic entities, wherein the set of problematic entities includes the entities reporting the networked system configuration problem;
determining a set of problem associated entities, wherein the set of problem associated entities includes the entities with a common association having a strongest correlation to the set of problematic entities, the determining comprising:
identifying one or more associations for each entity, the one or more associations defining links between the entities;
generating a list of association instances from the identified one or more associations;
creating lists of entities, wherein each list of entities is created on a per association instance basis;
applying a metric to each list of entities with respect to the set of problematic entities, wherein the metric includes at least one of a precision metric and a recall metric representing a ratio of an intersection of each list of entities with respect to the set of problematic entities; and selecting the association instance for the list of entities with a top ranking metric as the common association having the strongest correlation to the set of problematic entities;

classifying the set of problem associated entities on an attribute basis to determine one or more attributes of the entities that contribute to the networked system configuration problem; and reporting the best practices for configuring the networked system of entities as avoiding the one or more attributes of the entities that contribute to the networked system configuration problem.

17. The computer program product of claim 16 wherein classifying the set of problem associated entities on an attribute basis is performed using a decision tree.

* * * * *